Aug. 11, 1964
C. B. JONES ETAL
3,143,786
BAR AND WIRE PROCESSING MACHINE
Filed Jan. 27, 1961
4 Sheets-Sheet 1
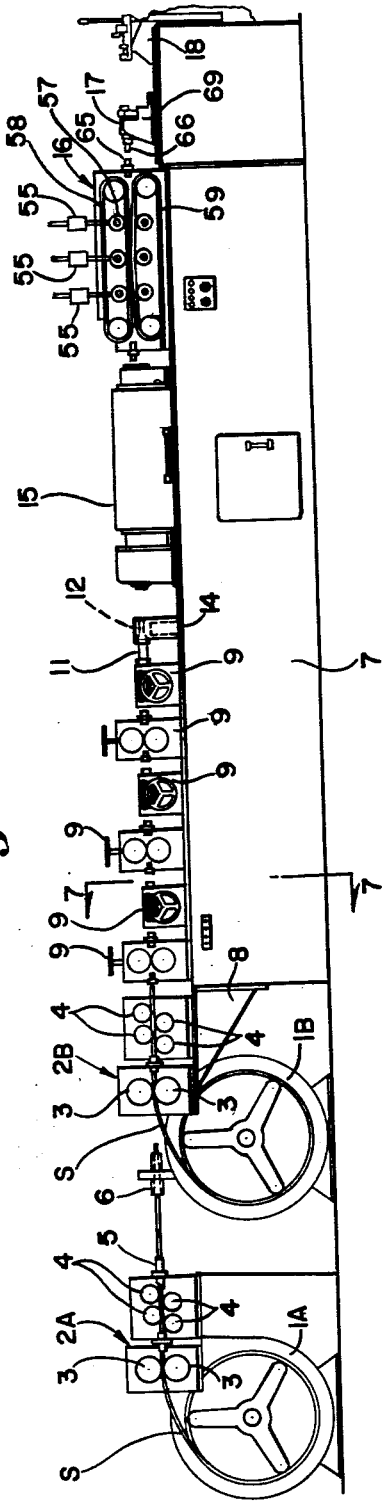
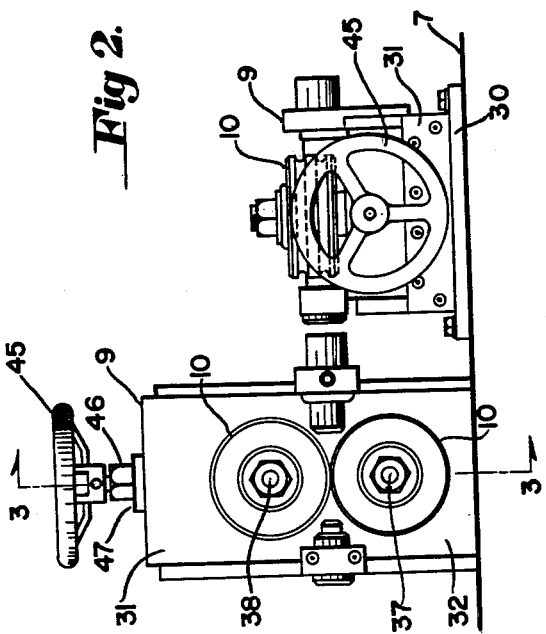
INVENTOR.
CARL B. JONES & VINCENT F. SUKLE
BY
Oberlin, Maky & Donnelly.
ATTORNEYS

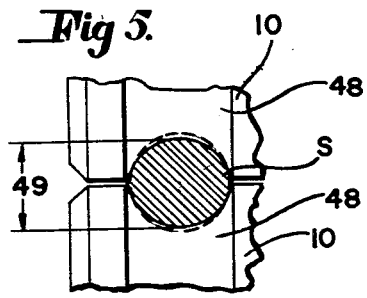
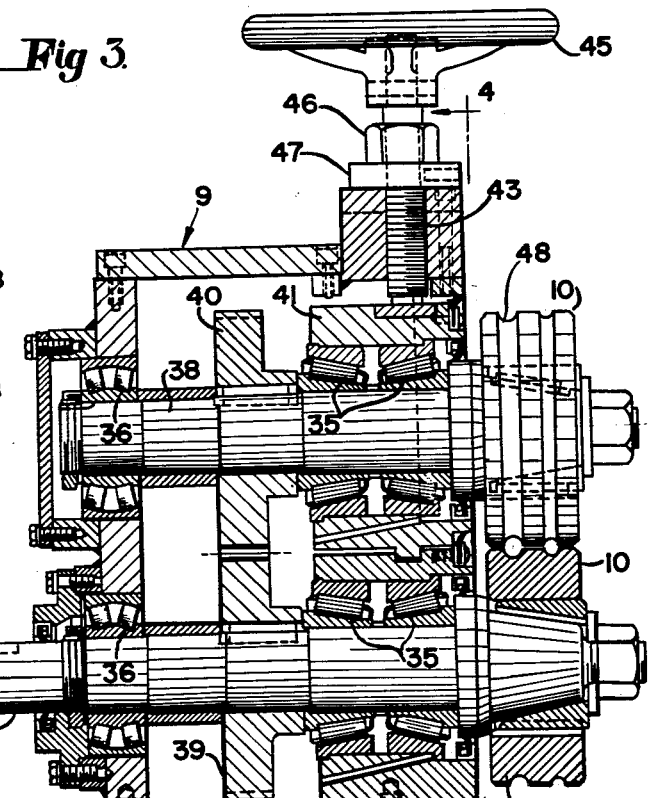
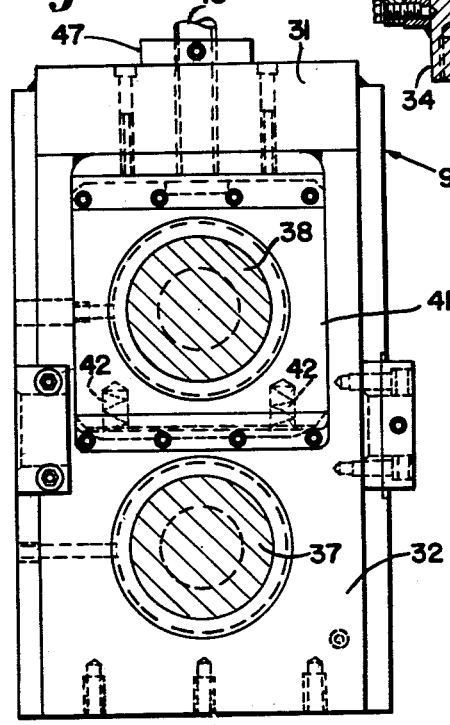
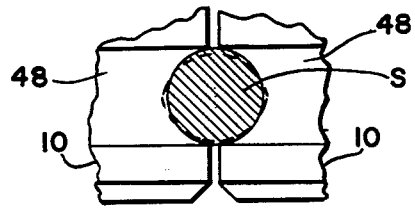

Aug. 11, 1964  C. B. JONES ETAL  3,143,786
BAR AND WIRE PROCESSING MACHINE
Filed Jan. 27, 1961  4 Sheets-Sheet 4

INVENTOR.
CARL B. JONES & VINCENT F. SUKLE
BY
Oberlin, Maky & Donnelly
ATTORNEYS United States Patent Office 3,143,786
Patented Aug. 11, 1964

3,143,786
BAR AND WIRE PROCESSING MACHINE
Carl B. Jones, Hudson, and Vincent F. Sukle, Oakwood, Bedford, Ohio, assignors to The Vaughn Machinery Company, Cuyahoga Falls, Ohio, a corporation of Ohio
Filed Jan. 27, 1961, Ser. No. 85,338
15 Claims. (Cl. 29—33)

The present invention relates generally as indicated to a bar and wire processing machine and, more particularly, to a straightline stock processing machine that entails use of aligned roll passes and an extrusion die for decreasing the cross-section of the stock and cold-working at as distinguished from use of drawing frames wherein the stock is wrapped around a series of draw blocks and is pulled thereby through successive dies.

Aside from the fact that drawing of stock with such drawing equipment may set up undesired internal stress in the stock due to its being coiled about the successive draw blocks, there is the problem that, if drawing is to be continuously performed, an accummulator or the like must be provided for accumulating stock thereon to permit welding of the tail end of one coil to the leading end of the next coil. On the other hand, if no such accumulator is provided, then it is necessary to shut down the equipment at frequent intervals, to point the leading end of the successive coil and to pull it through the successive dies and around the successive draw blocks. When it is considered that large size stock of, say ¾" diameter may be processed at the rate of 300 ft./min. with only about 1200 feet of stock in each coil, the welding or pointing operations aforesaid would have to be done every four minutes at substantial expense (in the case of welding) or with loss of production of the equipment (in the case of shut down during pointing and re-stringing).

Accordingly, it is one principal object of this invention to provide a stock processing machine which by reason of its straight line arrangement avoids set up of internal stresses in the stock.

It is another object of this invention to provide a stock processing machine with which it is possible to produce finished stock to close tolerances.

It is another object of this invention to provide a stock processing machine which results in production of stock having a good quality surface finish thereon.

It is another object of this invention to provide a stock processing machine capable of being operated continuously with successive coils of stock fed end to end into the machine without down time.

It is another object of this invention to provide a machine for processing bar, wire, or like elongated stock, wherein the following steps are performed in sequence:

(a) Preliminary straightening of the coiled stock as with conventional roll straighteners;

(b) Feeding the straight end stock through sets of roll stands to effect progressive reduction in cross-section size of the stock;

(c) Forcing the rolled and reduced stock through a finishing, extruding die;

(d) Feeding the extruded stock through a final rotary or like straightener, if desired or necessary; and (e) Feeding the straight stock as thus reduced by rolling and extrusion, through a cutting device to a run-out table for cutting into straight lengths, the tail end of the stock being drawn through the extrusion die and the rotary straightener by a feed unit disposed between the rotary straightener and the stock cutting device.

It is another object of this invention to provide a machine for processing bar, wire, or like stock, as aforesaid, in which successive roll stands are effective, in connection with round stock, for example, first to deform the stock by rolling it to generally oval cross-section and then to deform the stock back to generally circular cross-section by rolling it across the major axis of the oval section, such alternate squeezing of the stock by rolling to oval section and thence back to circular section being continued as many times as necessary, and being followed by extrusion of the stock through a finishing die under the influence of the frictional drive afforded by the successive roll stands.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a front elevation view of a stock processing machine embodying the present invention;

FIG. 2 is a front elevation view of one of the several sets of horizontal and vertical reducing roll stands employed in the present stock processing machine;

FIG. 3 is a transverse cross-section view of the horizontal roll stand taken substantially along the line 3—3, FIG. 2;

FIG. 4 is a cross-section view taken substantially along the line 4—4, FIG. 3;

FIGS. 5 and 6 are fragmentary cross-section views on enlarged scale showing how the stock is deformed to oval and then circular cross-section as it passes between the rolls of successive horizontal and vertical roll stands;

Figure 7:
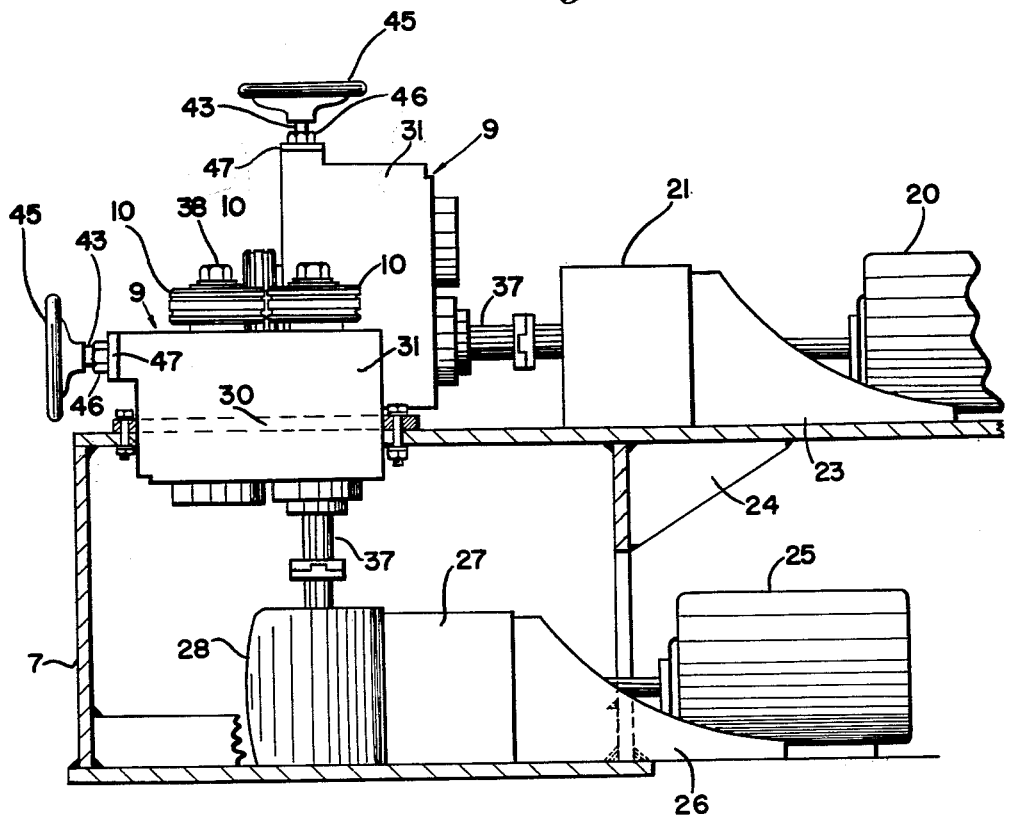
FIG. 7 is a transverse cross-section view of the stock processing machine herein, such view being on somewhat enlarged scale and taken substantially along the line 7—7, FIG. 1 showing the drive motors for the respective vertical and horizontal roll stands.

Referring now in detail to the drawings, and first to FIG. 1, which is somewhat schematic in form, the bar and wire processing machine therein disclosed comprises a pair of coil supports 1A and 1B on each of which a coil of stock S to be processed is adapted to be placed. Adjacent each coil support 1A and 1B is a payoff-feed and straightener unit 2A and 2B, the stock S being introduced into the nip of the power-driven feed rolls 3 for feeding of the stock S axially between the power-driven straightening rolls 4. Between the coil supports 1A and 1B are suitable tubular guides 5 and 6 whereby the straightened stock S from the coil support 1A is guided for following the tail end of the stock S from the other coil on support 1B into the associated payoff-feed and straightener unit 2B. Of course, when the coil of stock S on the coil support 1A is being processed, the beginning end of the coil of stock S on the other coil support 1B will be introduced into the nip of the feed rolls 3 of unit 2B following the tail end of the stock S from the coil support 1A and unit 2A. In this way stock S may be continuously fed into the machine and all that the operator need do while the machine is processing one coil is to provide another coil on the empty coil support 1A or 1B.

Adjacent the coil stand 1B is the base 7 of the machine herein, on the bracket 8 of which the payoff-feed and roll straightener unit 2B is mounted.

The straightened end of the stock S, upon emergence from the unit 2B passes successively through three pairs of reducing roll stands 9 of which the first one of each pair is a horizontal roll stand and the other one is a vertical roll stand. Each roll stand 9 has a pair of grooved rolls 10, 10 arranged so that the stock is deformed from circular to oval section in the horizontal stands (rolls 10 mounted on horizontal shafts) and from oval to circular section in the vertical stands (rolls 10 mounted on vertical shafts). Thus, in the present example the three such sets of reducing roll stands 9 effect, respectively, first, second, and third reductions in the diameter of the stock. Adjacent the last reducing roll stand 9 is a guide tube 11 through which the reduced stock S is forced and guided for entering the extruding die 12 mounted in the die stand 14.

After extrusion of the stock S from die 12 it passes through a rotary straightener 15 which is the subject matter of the copending application of Carl B. Jones, Ser. No. 38,331, filed June 23, 1960. From the rotary straightener 15, the straightened, reduced stock S is advanced between the parallel runs of a caterpillar feed unit 16 which prevents twisting of the stock S due to the rotary straightening operation and finally, the stock S is fed by the caterpillar feed unit 16 to a flying shear 17, or the like, which cuts the stock for feed to a suitable run-out table 18.

As an example of the present machine, $13/16''$ diameter round stock, that is, of $.813'' \pm .015''$ diameter, may be reduced $.068''$ in diameter in three passes or about $.022''$ per pass between each set of roll stands 9. This would reduce the $.828''$ maximum diameter stock to $.760''$ diameter, whereupon to produce stock of $.750''$ $$+.000$$
$$-.002$$

the final reduction by extrusion through die 12 would only be about $.010''$.

Having thus described the general structure of the machine herein, reference will now be made to the details of the reducing roll stands 9 and the drive means therefor as shown in FIGS. 2 to 7.

The six roll stands 9 as shown in FIG. 1 are of the same structure except that every other one herein, the first, third and fifth ones, have the rolls 10 mounted on horizontal shafts whereas the remaining stands 9, namely, the second, fourth and sixth ones, have the rolls 10 thereof mounted on vertical shafts.

As best shown in FIG. 7, each horizontal roll stand 9 is driven by an electric motor 20 through a suitable gear reducer 21, the motor 20 and gear reducer 21 being mounted on the top of the base 7 on suitable brackets 23 and 24. The vertical roll stands 9, on the other hand, are each driven by a motor 25 on the bracket 26 through a speed reducer 27 and an angle drive unit 28.

Therefore, because the roll stands 9 may be of substantially identical structure except for position of mounting, FIGS. 3 and 4 of the drawings illustrate only the horizontal roll stand 9. When the horizontal stand 9 in FIGS. 3 and 4 is used as a vertical roll stand it will be provided with a peripheral mounting flange 30 as best shown in FIG. 2.

The roll stand housing 31 herein shown is of generally rectangular form having fixed front and rear end plates 32 and 34 in which are disposed suitable roll antifriction bearings 35 and 36 for the respective roll drive shafts 37 and 38. Keyed onto the main drive shaft 37 adjacent the heavy duty bearing 35 are a drive gear 39 and the bottom roll 10.

In mesh with the drive gear 39 is a similar gear 40 keyed on the top shaft 38. Also keyed on the top shaft 38 is the top roll 10.

The top bearing 35 is mounted in a rectangular slide 41 that is vertically adjustable along the sides of the rectangular opening in the plate 32. Springs 42 are operative to hold the upper end of the slide 41 in engagement with the adjusting screws 43 that is rotated by hand wheel 45. Locking of screw 43 may be effected as by locknut 46 which clamps collar 47 (axially slidably keyed on screw 43) against the top of housing 31.

Thus, in the case of the successive sets of roll stands 9 and with reference to the example previously given, the first roll stand 9 will be adjusted so that at the nip of the roll grooves 48 in use the distance 49 from the bottom of the groove 48 of one roll 10 to the bottom of the groove 48 of the other roll 10 is less than the diameter of the round stock S introduced into the nip of said rolls. Thus, the stock S will be squeezed as in FIG. 5 to oval cross-section and elongated thereby, and, similarly, the second roll stand 9 will be operative as in FIG. 6 to squeeze the oval stock across its major diameter to restore it to circular cross-section and to elongate it. The alternating squeezing to oval cross section and thence back to circular section is continued as many times as is necessary, and in the specific example herein given, the stock S is decreased from $.813'' \pm .015''$ diameter to $.760''$ diameter.

Figure 8:
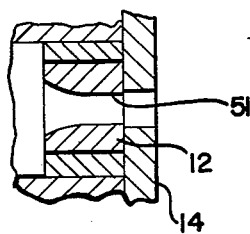
FIG. 8 is a fragmentary cross-section view through the extrusion die which is located between the last of the roll stands and the rotary straightener.

The $.760''$ diameter stock S, as it leaves the nip of the last vertical roll stand 9, enters the guide tube 11 and passes through the extrusion die 12 which, as best shown in FIG. 8, has a circular die opening 51 flared at its left inlet end. The extruded stock S in the illustrative example is reduced in diameter from $.760''$ to $.750''$ $$+.000$$
$$-.002$$

by extrusion.

It is to be noted that as long as the stock S is being worked upon by all six roll stands 9, they jointly contribute in providing the necessary friction to force the stock S through the extrusion die 12.

The extruded stock S, as aforesaid, then passes into a suitable straightener 15 which, for the purposes of the present invention, may be a rotary straightener which in lieu of that in the copending application may include cross rolls that are formed with concave peripheries and disposed with their axes askew and carried in a revolving frame.

Moreover, as later discussed in connection with the schematic wiring diagram of FIG. 9, as the tail end of the stock S passes the first, second, etc. roll stands 9, the driving force for extrusion becomes progressively less. Therefore, at the proper time, as signaled by the tail end of the stock S permitting closing of a switch the caterpillar feed unit 16 is energized to apply greater lateral gripping pressure on the stock S so that it will not only be drawn through the rotary straightener 15, but, in addition, will be drawn through the extruding die 12. Such added drawing force may be achieved as by applying higher fluid pressure in the cylinders 55 for the slides 56 of the backup rolls 57 for the top chain 58. Thus, the stock S will be very firmly gripped between the grooves of the parallel runs of the chains 58 and 59.

The leading end of the stock S moving toward the right from the caterpillar feed unit 16 passes through suitable guides 65 and 66 and when the end thereof engages a length gauge (not shown) on the run-out table 18, the flying shear unit 17 will cut it to predetermined length.

The flying shear 17 preferably is arranged to have an adjustable travel of say, from 2½ to 8″ so that it can be employed for cutting the stock into short lengths. Normally, for long lengths, the flying shear 17 will be adjusted for 6″ travel. Herein (see FIG. 9) the run-out table 18 will have a switch 67 mounted thereon arranged to be closed by the lead end of the stock S before the stock engages the length gauge. This closing of the switch 67 energizes the drive motor 68 for the base 69 of the flying shear 17 so that it and the cutoff blades 70 and 71 travel nearly in unison with the stock. Thereafter, the blade 71 will be moved down through a cam or the like to effect shearing of the stock S. The lightweight blades 70 and 71 are carried for movement with respect to the base 69 so as not to require acceleration of the heavy weight of the base 69. Of course once the stock S has been sheared the blade 71 moves up and blade 70 is moved rearwardly to free the severed piece of stock between the end of blade 70 and the length gauge. A complete discussion of such flying shear 17 will be found in the aforesaid copending application.

Figure 9:
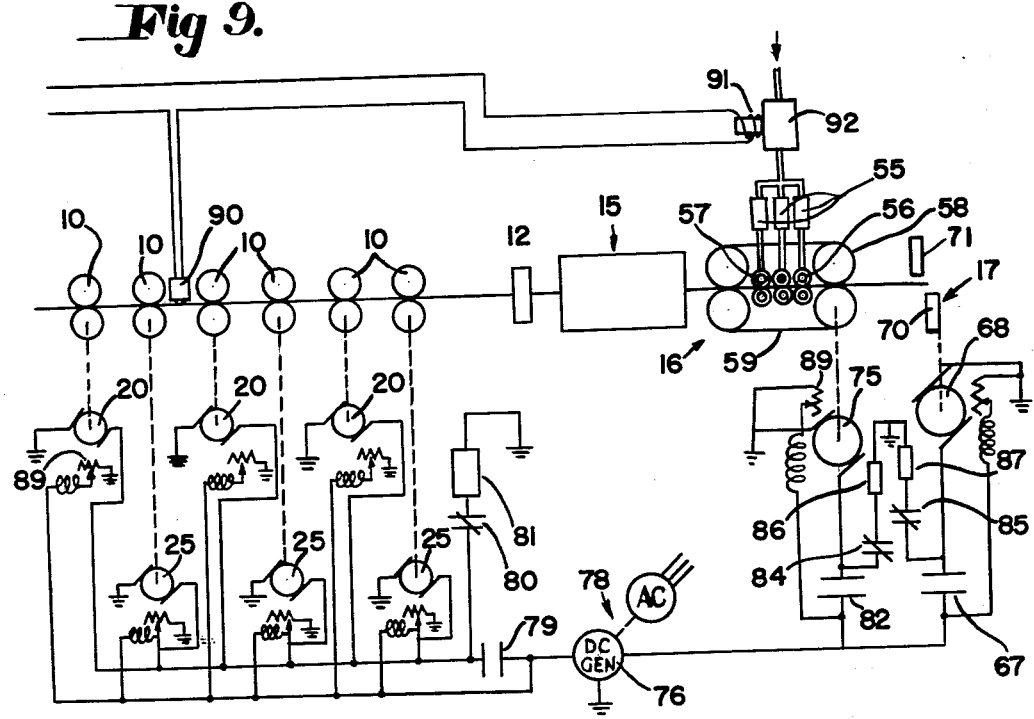
FIG. 9 is a schematic wiring diagram for effecting automatic operation of the stock processing machine herein.

Referring now to the schematic diagram FIG. 9, the roll stand drive motors 20 and 25, the feed unit drive motor 75 and the flying shear drive motor 68 are preferably D.C. motors connected with the D.C. generator 76 of the motor generator set 78 shown. Associated with the roll stand drive motors is a control switch including relay contacts 79 and 80, the latter having associated therewith a dynamic braking resistor 81 as shown, whereby when the contacts 79 are opened to open the roll stand motor armature circuits, the contacts 80 will be closed to render the dynamic braking component 81 effective in well-known manner to quickly stop the rotation of the rolls 10 of the roll stands 9. Similarly, there are control switches associated with the feed unit 16 and flying shear drive motors 75 and 68 having contacts 82, 84 and 67, 85, the latter having associated therewith the dynamic braking components 86, 87.

Each roll stand drive motor 20 and 25 is designed for substantially constant speed operation, while the speed of the rolls 10 is controlled by the associated gear reduction units 21 and 27. Accordingly, the machine control panel (not shown) may be provided with ammeters indicating the current draw of each roll stand drive motor 20 and 25 and of the feed unit drive motor 75, and these motors in turn will have motor field rheostats 89 so that the current draws thereof may be set as desired so that in the case of the roll stand drive motors 20 and 25 each will tend to drive the stock S slightly faster than the actual lineal speed thereof at successive stages of reduction and thereby the six motors will conjointly feed the stock S lineally and force it through the extrusion die 12. On the other hand, the motor field rheostat 89 of the feed unit drive motor 75 will be set to apply sufficient frictional gripping force on the roll reduced and extruded stock emerging from the rotary straightener to prevent twisting of the stock due to the action of the rotary straightener and to feed the stock to the runout table 18 and flying shear 17.

As previously mentioned, a suitable limit switch 90 may be provided, as between the first and second roll passes, or elsewhere, if desired, arranged to close when the tail end of the stock S passes the switch 90. When the limit switch 90 is closed, it energizes the coil 91 of a solenoid operated pressure regulating valve 92 or the like, to admit increased air pressure into the pneumaitc cylinders 55 that are associated with the backup rolls 57 for the lower run of the upper chain 58 of the chain feed unit 16, thereby increasing the frictional grip of the rolled, extruded, and straightened stock S between the chains 58 and 59. At the same time, the ampere draw of the motor 75 will increase so that the feed unit 16 thereafter is the dominating factor in the continued lineal travel of the stock S as successive roll stands 9 are disengaged from the stock. Accordingly, the chain feed unit 16, after the tail end of the stock S passes the last roll stand 9 applies a straight pull on the stock S to draw the tail end through the die 12 and through the rotary straightener 15.

Other modes of applying the principle of the invention may be employed, change being made as regards the details described, provided the features stated in any of the following claims, or the equivalent of such, be employed.

We therefore particularly point out and distinctly claim as our invention:

1. A stock processing machine comprising a series of roll stands having power-driven rolls in the nip of whcih elongated stock is adapted to be lineally fed, the rolls of successive stands being formed with peripheral grooves operative, in the case of round stock, first to squeeze opposite sides of the stock to reduced cross-section area of generally oval shape and then to squeeze the oval stock across the major axis thereby effecting further reduction in the cross-section area and restoring it to substantially round shape; an extrusion die adjacent to said series of roll stands through which the stock is forced endwise by said rolls and thereby further reduced in cross section area; caterpillar feed means following said die operative, when energized, to pull the tail end of the stock through said die; and control means responsive to approach of the tail end of the stock toward said die effective to energize said draw means as aforesaid so as to frictionally grip the reduced stock with sufficient force to draw the tail end of the stock through said die.

2. The machine of claim 1 wherein a plurality of coil stands are provided in advance of said series of roll stands from which stock in coiled form is supplied successively for rolling and extrusion.

3. The machine of claim 1 wherein a plurality of coil stands are provided in advance of said series of roll stands from which stock in coiled form is supplied successively for rolling and extrusion; and wherein a stock straightener is provided in advance of said series of roll stands effective to straighten the coiled stock before rolling and extrusion.

4. The machine of claim 1 wherein a plurality of coil stands and associated stock straighteners are provided in advance of said series of roll stands from which stock in coiled form on said coil stands is straightened and thence successively fed to said roll stands and die for rolling and extrusion.

5. The machine of claim 1 wherein a rotary stock straightener is interposed between said caterpillar feed means and said series of roll stands, said caterpillar feed means being frictionally engaged with the stock at all times to resist twisting thereof due to operation of said rotary straightener.

6. The machine of claim 1 wherein drive motors for the respective roll stands are arranged conjointly to force the stock endwise through said extrusion die.

7. The machine of claim 1 wherein a flying shear means is provided after said draw means to sever the stock into lengths as it continuously emerges from said draw means.

8. A stock processing machine comprising a series of roll stands having power-driven rolls in the nip of which elongated stock is adapted to be lineally fed, the rolls of successive stands being formed with peripheral grooves operative, in the case of round stock, first to squeeze opposite sides of the stock to reduced cross-section area of generally oval shape and then to squeeze the oval stock across the major axis thereby effecting further reduction in the cross-section area and restoring it to substantially round shape; an extrusion die adjacent to said series of roll stands through which the stock is forced endwise by said rolls and thereby further reduced in cross-section area; elongated power feed means following said die operative, when energized, to firmly frictionally engage the rolled and extruded stock to pull the tail end through said die; and control means for said feed means responsive to decrease in the number of roll stands exerting endwise force on the stock as the tail end of the stock approaches said die effective to energize said feed means as aforesaid so as to frictionally grip the reduced stock with sufficient added force to draw the tail end of the stock through said die.

9. The machine of claim 8 wherein stock guides are provided between successive roll stands and between the last one of said roll stands and said die to support the stock against buckling as it is forced endwise from one roll stand to the next and from the last roll stand through said die.

10. The machine of claim 8 wherein said feed means comprises a pair of power driven endless chain belts having backed-up parallel runs between which the stock is frictionally gripped, and fluid power means actuated by said control means effective to urge one parallel run toward the other to apply such added force as required to draw the stock through said die.

11. A stock processing machine comprising a series of roll stands and an associated series of drive means for driving the rolls of the respective stands to receive elongated stock in the nip for lineal feed from one roll stand to the next, the rolls of successive stands being formed with peripheral grooves operative, in the case of round stock, first to squeeze opposite sides of the stock to reduced cross-section area of generally oval shape and then to squeeze the oval stock across the major axis thereby effecting further reduction in the cross-section area and restoring it to substantially round shape; and extrusion die adjacent to said series of roll stands through which the roll-reduced stock is forced endwise by said rolls and thereby further reduced in cross-section area; power feed means following said die operative, when energized, to pull the tail end of the stock through said die; and control means actuated responsive to approach of the tail end of the stock toward said die, and consequent passing of the first and successive roll stands, by the tail end of the stock, effective to energize said feed means as aforesaid so as to frictionally grip the roll and extrusion-reduced stock with sufficient force to draw the tail end of the stock through said die even after passing all of said roll stands.

12. The machine of claim 11 wherein a rotary stock straightener is disposed between said die and said feed means effective to straighten the roll and extrusion-reduced stock for subsequent severing into straight lengths; the power feed means being, at all times, in frictional engagement with the stock to resist twisting thereof as it is operated upon by said straightener.

13. The machine of claim 12 wherein said power feed means comprises a pair of endless chain belts having backed-up parallel runs between which the stock is gripped.

14. The machine of claim 13 wherein said control means, when actuated, urges the back-up of one of said parallel runs toward the other to increase the magnitude of the frictional gripping of the stock between said belts as required to draw the tail end of the stock through said die.

15. A stock processing machine comprising a straight series of roll stands having alternate power-driven rolls disposed for rotation about horizontal and vertical axes in the nip of which elongated stock is adapted to be lineally fed, the horizontal and vertical rolls of alternate stands being formed with aligned peripheral grooves operative, respectively, in the case of round stock, first to squeeze opposite sides of the stock to reduced cross-section area of generally oval shape and then to squeeze the oval stock across the major axis thereby effecting further reduction in the cross-section area and restoring it to generally round shape for further reduction by alternate horizontal and vertical rolls of the remaining roll stands; and extrusion die adjacent to said series of roll stands and aligned therewith through which the stock is forced endwise by all of said rolls and thereby further reduced in cross-section area; elongated power feed means following said die and aligned therewith operative, when energized, to pull the tail end of the stock through said die; and control means actuated responsive to approach of the tail end of the stock toward said die, and consequent passing of the tail end from the first and successive roll stands, effective to energize said feed means as aforesaid so as to frictionally grip the roll-reduced stock with sufficient force to draw the tail end of the stock through said die after it has passed from the last of said roll stands.

References Cited in the file of this patent

UNITED STATES PATENTS

| | | |
|---|---|---|
| 738,932 | O'Donnell | Sept. 15, 1903 |
| 769,603 | Fosberg | Sept. 6, 1904 |
| 1,124,761 | Lloyd | Jan. 12, 1915 |
| 1,511,540 | Thomas | Oct. 14, 1924 |
| 1,779,479 | Leech | Oct. 28, 1930 |
| 2,257,535 | Rohn | Sept. 3, 1941 |

FOREIGN PATENTS

| | | |
|---|---|---|
| 214,633 | Australia | Dec. 20, 1956 |